Jan. 30, 1951     O. E. STAPLES     2,539,597

TOOL CHECKING FIXTURE

Filed March 19, 1945

INVENTOR.
OTIS E. STAPLES
BY
Kwis Hudson Boughton & Williams
ATTORNEYS

Patented Jan. 30, 1951

2,539,597

UNITED STATES PATENT OFFICE 2,539,597

TOOL CHECKING FIXTURE

Otis E. Staples, Euclid, Ohio, assignor to The Cleveland Hobbing Machine Company, Euclid, Ohio, a corporation of Ohio Application March 19, 1945, Serial No. 583,473

1 Claim. (Cl. 33—174)

The present invention relates to tool checking devices and, more particularly, to a device for checking a circular or sector-like tool having a circumferential, arcuate'y-shaped cutting edge contiguous with transversely extending shoulder or chamfer forming cutting edges.

One of the principal objects of the invention is the provision of a novel and improved device for checking circular or sector-like tools, which device is comparatively simple in construction, relatively inexpensive to manufacture, extremely accurate in operation, and capable of withstanding considerable rough usage without impairing its accuracy.

Another object of the invention is the provision of a novel and improved tool checking device comprising a tool support and a cooperating microscope arranged for relative rotation about an axis concentric with the axis of a tool fixedly secured to the tool support, in combination with precision means for measuring the angle between different angular relative positions of the tool support and microscope.

Another object of the invention is the provision of a novel and improved tool checking device comprising a tool support and a cooperating microscope arranged for linear relative movement in a plane at right angles to and in a direction radially of the axis of rotation of a tool fixedly secured to the tool support, and means for determining the location of the microscope with respect to the tool for different relative positions thereof.

Figure 1:
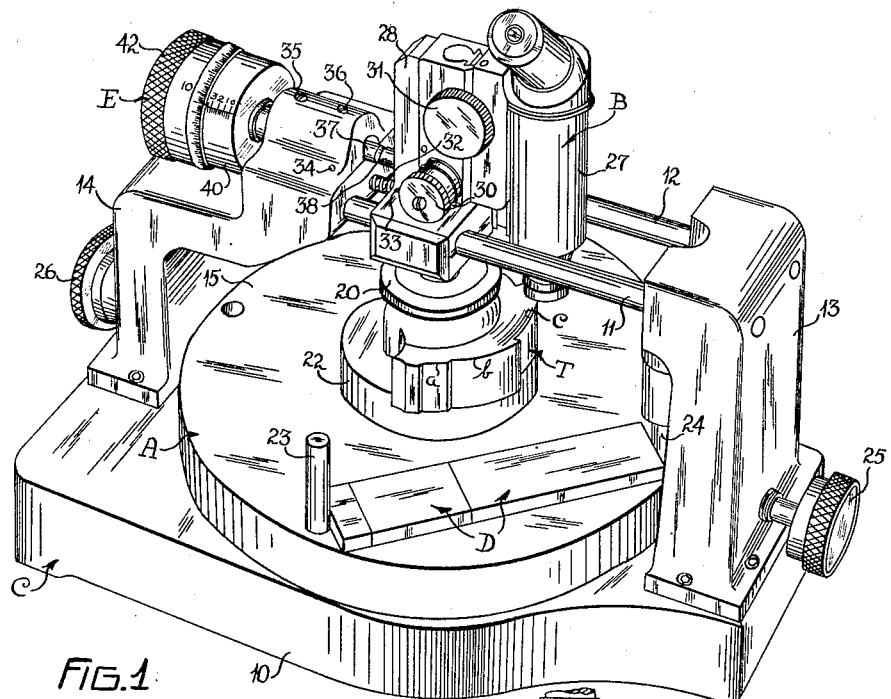
Figure 2:
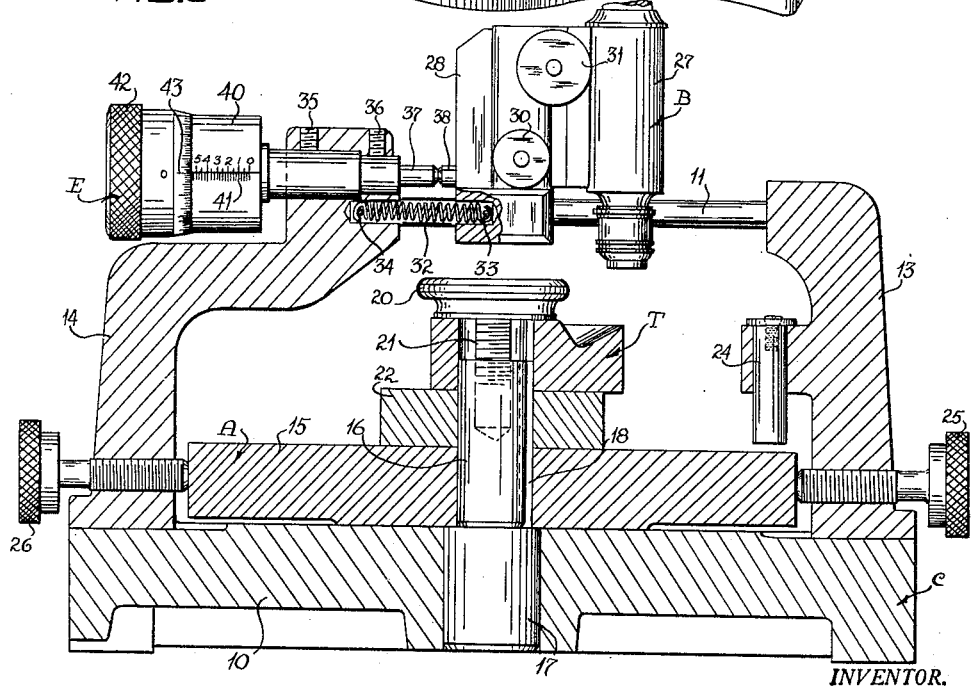

The invention resides in certain novel constructions and combinations and arrangements of parts and further objects and advantages thereof will be apparent to those skilled in the art to which it relates from the following description of the preferred embodiment described with reference to the accompanying drawings forming a part of this specification, in which:

Fig. 1 is a perspective view of a tool checking device embodying the present invention; and Fig. 2 is a sectional view through the device shown in Fig. 1.

The invention is herein embodied in a device particularly suitable for the checking of sector-like tools having radially offset, arcuately-shaped cutting edges connected by transversely extending shoulder wise cutting edges similar to the tool shown in U. S. patent to Carlin No. 2,233,398, however, it is to be understood that the invention is applicable to the checking of other types of circular tools, neither is it limited to the particular construction shown.

Generally speaking, the device shown in the drawings comprises a tool supporting assembly A and a cooperating microscope assembly B arranged for relative rotation about an axis concentric with the axis of rotation of a tool T secured to the tool supporting assembly and for linear relative movement in a plane at right angles to and in a direction radially of the axis of rotation of the tool, in combination with precision means for measuring the angle between different angular relative positions of the tool supporting assembly and the microscope assembly, and precision means for determining the location of the microscope with respect to the tool for different relative positions thereof. In the embodiment shown, the tool assembly is rotatably supported in the base 10 of the device and the microscope assembly is slidably supported on a pair of parallel rods 11 and 12 fixed to the upper ends of brackets 13 and 14, which brackets together with the base member 10 constitute the frame C of the device.

The tool supporting assembly A comprises a disk-shaped member 15 supported for rotation about a vertical axis upon the base 10 by cooperating finished surfaces on the underside of the disk 15 and the upper side of the base 10, and a vertically extending shaft 16 having an enlarged lower end 17 rotatably positioned within an aperture in the base 10. The disk 15 is fixedly keyed by an elongated key 18 to that part of the shaft 16 which is immediately above the enlarged portion 17 and the tool T is removably secured upon the upper end of the shaft 16 by a headed screw 20, the shank 21 of which is threaded into a suitably tapped aperture in the upper end of the shaft 16 and the enlarged head of which is adapted to engage the upper surface of the tool T. Preferably a spacer 22 is interposed between the tool T and the top of the disk 15, which spacer is of less diameter than that of the tool proper so that the tool will overhang the spacer, thus admitting light underneath the edges of the tool which facilitates manipulation of the microscope, etc.

The precision means shown for determining the different angular positions of the tool supporting assembly A is in the order of a sine bar and comprises a pair of cylindrical pins 23 and 24 connected to the tool supporting assembly and to the frame C, respectively, and adapted to receive therebetween space gauges, designated generally by the reference character D. In the particular embodiment shown, the various angular positions on the tool T are determined with reference to the near side of the keyway therein, from which it follows that the cylindrical pins 23 and 24 are positioned with reference to the axis of rotation of the tool supporting assembly A and the near side of the key 18. As previously stated, the key 18 extends to the top of the shaft 16 and locates the tool T when positioned on the shaft. Hand screws 25, 26 threaded into suitably tapped apertures in the brackets 13 and 14, respectively, provide means for securing the tool holder assembly in any desired angular position.

The microscope assembly B comprises a microscope 27 fixed to a microscope holder 28 slidably supported on the parallel rods 11 and 12, previously referred to. The microscope 27 is of commercial construction and will not be described in detail. Suffice it to say that it includes reference indicia, preferably cross-hairs, and slow and fast vertically adjusting screws 30 and 31 of conventional construction. The brackets 13 and 14 which support the parallel rods 11 and 12 and, in turn, the microscope assembly B, are fixedly secured to opposite ends of the base 10 and the parallel rods are so located that if the microscope assembly could be moved far enough to the left to position the microscope proper above the shaft 16, the intersection of the cross-hairs could be made to coincide with the axis of rotation of the tool T and the shaft 20.

The microscope assembly B is continuously pulled towards the left, as viewed in the drawings, by a tension spring 32, the right-hand end of which is fixed by a pin 33 in the bottom of an aperture in the base of the microscope holder 28 while the left-hand end thereof is fixed by a pin 34 in the bottom of a similar aperture in the bracket 14. The construction is such that when the microscope assembly is moved to extreme left-hand position, the spring 32 is wholly enclosed within the apertures in the microscope holder 28 and the bracket 14. The microscope assembly is adapted to be moved toward the right along the parallel rods 11 and 12 by a micrometer device, designated generally by the reference character E, adjustably secured in a horizontal aperture in the bracket 13 by setscrews 35, 36, with the right-hand end of the movable member or screw 37 in engagement with an abutment in the form of a pin 38 fixed to the microscope holder 28. The micrometer E is of commercial construction and will not be herein described in detail. Suffice it to say that it comprises a stationary housing 40 having indicia 41 thereon and within which the movable micrometer screw 37 is rotatably supported. The micrometer screw is provided with an enlarged cup-like head 42 which normally extends over the left-hand end of the stationary housing 40 and has indicia 43 thereon which cooperates with the indicia 41 on the housing 40 to indicate the projection of the micrometer screw beyond the right-hand end of the housing 40 or, in the present instance, the position of the microscope assembly along the parallel rods 11 and 12. Preferably the construction is such that the distance of the cross-hairs from the axis of rotation of the cutter T can be read directly to the nearest thousandth of an inch.

From the foregoing, it will be readily seen that the radial distance of the arcuately-shaped cutting edges a, b, c, of the tool T can be readily determined by rotating the disk 15 until the particular cutting edge in question is in position to be viewed through the microscope, adjusting the microscope assembly longitudinally of the parallel rods 11, 12 until the vertical cross-hair coincides with the cutting edge and then reading the micrometer indicia. As will be readily understood by those skilled in the art to which the invention relates, the device may be arranged so that some distance other than the radial distance of the cutting edge from the axis of rotation of the tool may be read on the micrometer, from which reading the accuracy of the cutter may be determined, the important consideration being that the microscope and micrometer assemblies make it possible to accurately determine the radial distance of any of the arcuately-shaped cutting edges of the tool or, in fact, any point of the tool from the axis of rotation or some other reference point of the tool. By the positioning of space gauges D intermediate the posts 23 and 24 the accuracy of the angular position of any of the radial or side cutting edges with respect to each other or a predetermined reference point on the tool can be readily checked.

From the foregoing, it will be apparent that the objects of the invention heretofore enumerated and others have been accomplished and that there has been provided a simple and durable device for checking the accuracy of circular cutters. While the preferred embodiment of the invention has been described in considerable detail, it is to be understood that the invention is not limited to the particular construction shown and it is my intention to hereby cover all adaptations, modifications and uses thereof which come within the practice of those skilled in the art to which the invention relates and within the spirit and scope of the appended claim.

Having thus described my invention, what I claim is:

In a tool checking device of the character referred to, a rigid frame comprising a base having two fixed spaced support members projecting from said base, a table rotatably journaled on said base between said support members, means for fixing a tool on said table concentric with the axis of said table, a guide device extending between and supported by said support members, a microscope movable along said guide and having a reference point movable in a plane containing said axis, a micrometer carried by one of said supporting means and including a shank axially movable in the direction of movement of said microscope, and a spring interconnecting said one support member and said microscope and adapted to urge said microscope against said shank.

OTIS E. STAPLES.

REFERENCES CITED

The following references are of record in the file of this patent:

UNITED STATES PATENTS

| Number | Name | Date |
| --- | --- | --- |
| 1,256,794 | Hanton | Feb. 19, 1918 |
| 1,615,668 | Anderson | Jan. 25, 1927 |
| 1,927,992 | Pulver | Sept. 26, 1933 |
| 2,013,365 | Snarry | Sept. 3, 1935 |
| 2,060,518 | Miller | Nov. 10, 1936 |
| 2,143,241 | Hallenbeck | Jan. 10, 1939 |
| 2,198,757 | Bohrn et al. | Apr. 30, 1940 |
| 2,207,625 | Lester | July 9, 1940 |
| 2,309,142 | Stafford | Jan. 26, 1943 |
| 2,313,133 | Ernst | Mar. 9, 1943 |

FOREIGN PATENTS

| Number | Country | Date |
| --- | --- | --- |
| 618,927 | Germany | Sept. 19, 1935 |